March 28, 1967  R. C. MELANDER  3,310,912
ARTICLE HOLDER
Filed Aug. 3, 1965

INVENTOR
Richard C. Melander

BY
Stevens, Davis, Miller & Mosher
ATTORNEYS

United States Patent Office 3,310,912
Patented Mar. 28, 1967

3,310,912
ARTICLE HOLDER
Richard C. Melander, Ballston Spa, N.Y., assignor to Tufflite Plastics, Incorporated, Ballston Spa, N.Y.
Filed Aug. 3, 1965, Ser. No. 476,811
2 Claims. (Cl. 47—41.12)

This invention relates to a holder for decorative articles such as flora and a method of making the holder. More specifically, the invention relates to a holder for decorative articles composed of a patentably novel, highly foamed shaped article capable of having decorative articles inserted therein and having a backing bonded thereto for purposes of mounting the holder and a method of making same.

It is often desirable to utilize decorative devices to enhance the appearance of rooms, offices, desks and the like. In order to accomplish the above, it has been necessary to utilize vases and similar bulky devices which are difficult to hang on walls and to handle decorative articles such as flowers and the like and which are relatively expensive to manufacture.

In accordance with the present invention, a simple, inexpensive, shaped decorative article holder is provided which is of light weight, can be easily hung on walls and can easily support decorative devices such as flowers which are placed therein for support. There is also provided a simple and inexpensive method of making the above mentioned shaped article holder.

Briefly, in accordance with the present invention, there is provided a holder formed of shaped foamed and easily puncturable material capable of receiving and supporting articles by insertion of same into the foamed material. The articles are inserted into the holder by puncturing same with a portion of the article, as, for example, with the stem of a flower. The holder is bonded to a second much sturdier denser material which is not easily puncturable and which is capable of being permanently coupled to hanger devices which are secured to walls and the like.

Also, in accordance with the present invention, there is provided a method of making the above described holder wherein the second sturdy material is provided with a shaped depression. In this depression is placed a foamable material which is foamed in situ. The foamable material will foam up in substantially the shape of the depression and become bonded to the sturdy material to provide the shaped article holder.

It is therefore an object of this invention to provide an inexpensive, light, article holder capable of being secured to walls and the like.

It is further an object of this invention to provide an article holder formed from two bonded plastic materials.

It is a still further object of this invention to provide an article holder composed of a rigid polystyrene base bonded to a shaped polyurethane foam mass.

It is a yet further object of this invention to provide a shaped article holder by foaming a foamable material which is placed in a shaped depression in a rigid material and foaming the foamable material in situ.

The above objects and still further objects of this invention will immediately become apparent to those skilled in the art when considered in view of the following description of a preferred embodiment thereof and method of making same wherein.

Figure 1:
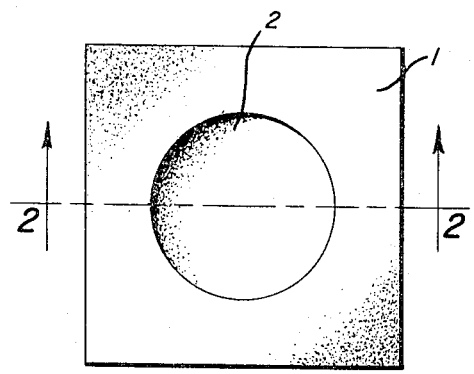
FIG. 1 is a top view of the shaped rigid backing material utilized in accordance with the present invention.
Figure 2:
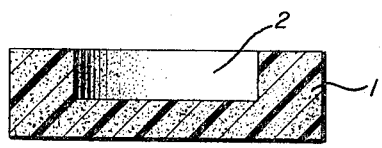
FIG. 2 is a cross-sectional view of the article of FIG. 1 taken along the line 2—2.

An article holder in accordance with the present invention is provided by first obtaining a backing material 1 (FIG. 1) of a relatively rigid material which is capable of retaining a hanger or the like therein under predetermined conditions of force thereon without rupturing. Materials such as polystyrene have been found to provide good results when used as a backing though it should be understood that any material having the proper rigidity which is also capable of being bonded to a foamed material can be used. A groove or depression 2 is formed in the backing material. This depression is shaped in a predetermined manner and is shown substantially circular in FIG. 1.

Figure 3:
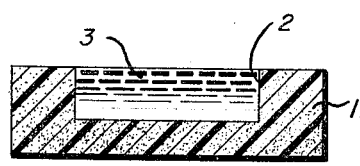
FIG. 3 is a cross-sectional view of the article of FIG. 1 taken along the line 2—2 wherein foamable material has been placed in the shaped depression.

The depression 2 is filled with materials capable of being foamed in situ and labelled as 3 in FIG. 3. The foamed material formed in the depression 3 is much less dense and less rigid than the backing material 1 and is capable of being easily punctured by objects such as flower stems and the like which are inserted therein.

A foam which has been found to provide excellent results is polyurethane. Such a foam is formed in situ by placing the necessary ingredients into the depression 2 as indicated by 3. These materials are well known in the art. For example, a polyurethane foam can be provided by placing a diisocyanate such as toluene diisocyanate, into the depression 3 along with a polyester having unreacted —OH groups such as carboxylic acid or water.

Figure 4:
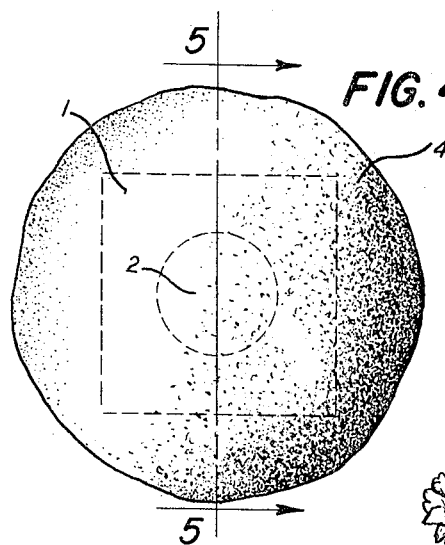
FIG. 4 is a top view of the completed foamed article.
Figure 5:
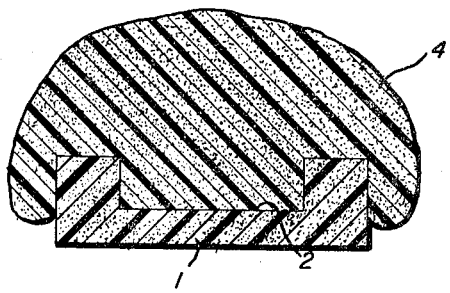
FIG. 5 is a cross-sectional view of the article of FIG. 4 taken along the line 5—5.

The foam formed by the mixture expands to many times the size of the original mixture and takes substantially the same shape as the depression. The foamed material also bonds to the backing. FIGURES 4 and 5 set forth the foamed material 4 taking substantially the same shape as the depression 2 and bonded to the backing 1.

Figure 6:
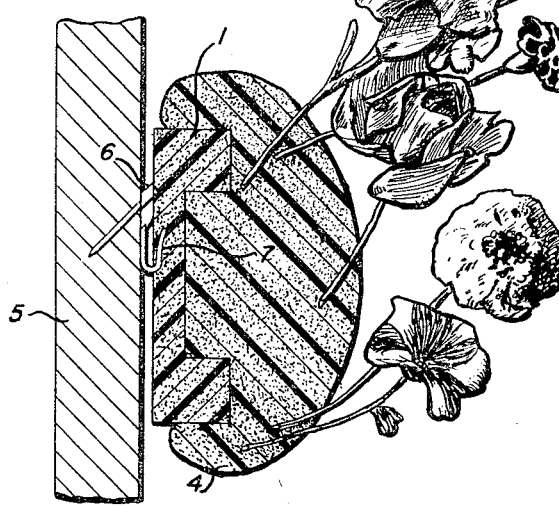
FIG. 6 is a view in elevation of one form of using the article of FIGS. 4 and 5.

FIGURE 6 shows the article holder in use wherein the backing 1 is secured to a wall member 5 by means of a hook member 7 and a nail 6. A decorative object such as a flower 8 is inserted into the less dense material 4.

Figure 7:
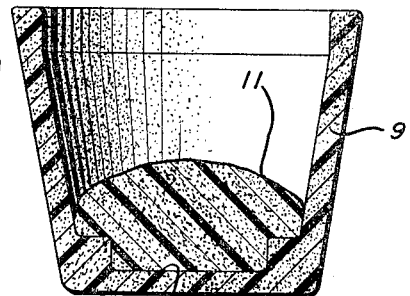
FIG. 7 is a cross-sectional view of a second embodiment in accordance with the present invention.

Referring now to FIGURE 7, there is set forth a second embodiment of the invention which includes a backing material 9 in the shape of a container having bottom and side walls with a depression 10 in the bottom. The foamable material is placed in the depression 10 and produces a foam 11 as in the embodiment of FIGURES 4 and 5. In this embodiment, however, the foam takes the shape of the depression until it has expanded to the outer walls of the backing material whereupon its further expansion is directed by the shape of the wall. The depression 10 could be omitted in this embodiment with the walls of the material 9 providing all of the shaping.

Though the invention has been described with respect to certain preferred embodiments thereof, many variations and modifications which come within the scope of the invention will immediately become apparent to those skilled in the art. It is therefore the intention that the appended claims be interpreted as broadly as possible in view of the prior art to include all such variations and modifications.

What is claimed is:

1. An ornamental article holder comprising a block like rigid backing member having at least one planar surface and a peripheral surface extending about said block, a pocket in said planar surface, said planar surface having laterally extending portions extending from said pocket, and a mass foamed in situ in said pocket and secured to said pocket, said planar surface, and peripheral surface of the backing member.

2. A holder as defined in claim 1 wherein the foamed mass is the reaction product of a polyisocyanate and a compound taken from the group consisting of a polyester having unreacted —OH groups and water to form a polyurethane foam.

References Cited by the Examiner

UNITED STATES PATENTS

| | | | |
|---|---|---|---|
| 2,965,584 | 12/1960 | Elkin | 47—41.12 |
| 3,073,062 | 1/1963 | Hoffman | 47—41.12 |
| 3,132,417 | 5/1964 | Irwin | 264—45 |
| 3,155,753 | 11/1964 | Weissman et al. | 264—45 |
| 3,201,900 | 8/1965 | King | 47—41.12 |

ABRAHAM G. STONE, *Primary Examiner.*

A. E. KOPECKI, *Assistant Examiner.*